(No Model.)
G. & J. E TOLSON.
APPARATUS FOR SEPARATING MIXED FIBERS.
No. 346,245. Patented July 27, 1886.
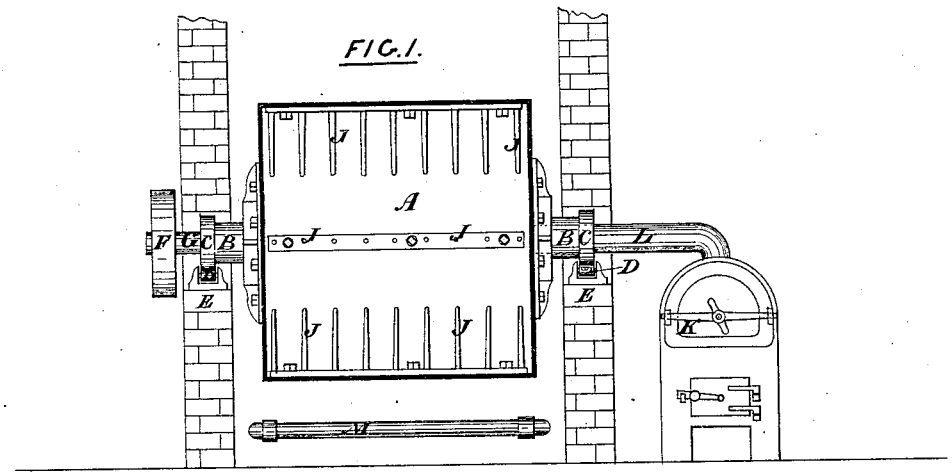
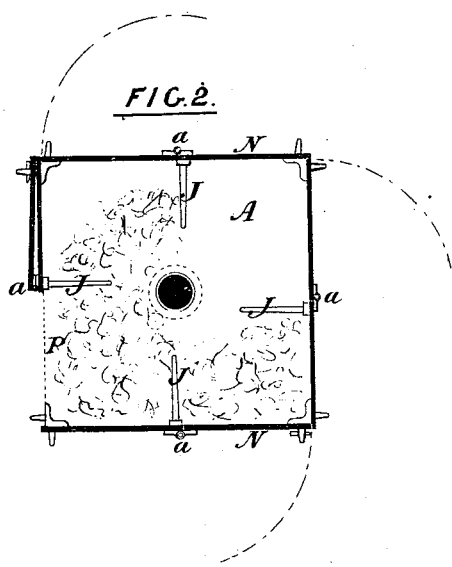
WITNESSES.
INVENTORS.

UNITED STATES PATENT OFFICE.

GEORGE TOLSON AND JOHN EDWIN TOLSON, OF DEWSBURY, COUNTY OF YORK, ENGLAND.

APPARATUS FOR SEPARATING MIXED FIBERS.

SPECIFICATION forming part of Letters Patent No. 346,245, dated July 27, 1886.

Application filed August 7, 1883. Serial No. 103,062. (No model.) Patented in England November 24, 1882, No. 5,591; in Germany January 31, 1883, No. 24,179; in Belgium January 31, 1883, No. 60,316, and in France February 2, 1883, No. 153,475.

*To all whom it may concern:*

Be it known that we, GEORGE TOLSON and JOHN EDWIN TOLSON, both subjects of the Queen of Great Britain, and residents of Dewsbury, in the county of York, England, have invented certain Improvements in Machines for Use in the Removal of Vegetable Fibers from Animal Fiber, of which the following is a specification.

Our invention relates to a machine for carrying out a method of separating vegetable from animal fibers, especially cotton from wool, where the two are mixed together.

Our invention will be best understood by reference to the accompanying drawings, wherein Figure 1 is a sectional elevation showing the interior of the rotatively-mounted tank, and Fig. 2 is a cross-section of the tank.

A is the rotary tank or receiver, shown as square in cross-section, and provided with tubular bearings B, with disk-like flanges C. These flanges rest upon anti friction rollers D, mounted in the masonry, E, which houses the tank.

F is the driving-pulley by which the tank is rotated, and this pulley is fixed on a shaft, G, secured in one of the tubular bearings B.

K is a retort which supplies hydrochloric gas to the tank, the gas being delivered through a pipe, L, enameled on its inside to protect it against the corrosive action of the gas. This pipe enters the tank through one of its tubular bearings B.

The tank is provided interiorly with inwardly-projecting prongs J, which serve to break up the mass of fiber in the tank as it revolves, and thus expose its contents the better to the action of the acid vapors.

In each face of the tank is hinged (at *a*) a door, N, at which the fiber is introduced and removed.

When desired, the tank may be lined with wire netting or gauze P, as shown in Fig. 2. This netting extends over one or more of the door-openings, and it enables the operator to open the door and examine the fiber without danger of its falling out.

The revolving tank is inclosed by walls E, and is heated by some means, a steam-coil, M, serving the purpose.

The operation is as follows: The animal fiber—as wool, for example—with which is mixed vegetable fibers—as cotton, for example—which it is desirable to decompose and remove, is placed in the tank, and the latter is hermetically sealed and heated sufficiently to prevent the gases introduced from condensing. The retort K is now charged with equal quantities of sulphuric acid and common salt and heated until the hydrochloric gas is evolved. This passes into the tank, which has been set in motion, and permeates the mass of fiber therein, decomposing the vegetable fiber mixed with the animal fiber, but not injuring the latter. After exposure for from twenty to forty minutes the decomposition is usually effected, and the operation may be discontinued. The fiber is now removed and shaken, for the purpose of removing the decomposed vegetable matter, after which the acid remaining in the wool should be neutralized by some one of the many known means of effecting this result.

We are aware of the device or apparatus described in British Patent No. 919 of 1868, and we make no claim to same. Our machine differs in several material respects from that described in said patent.

Having thus described our invention, we claim—

1. The close tank A, of rectangular form, mounted on hollow axes or journals, and provided with a door, N, in each of its four sides, constructed to close hermetically, with prongs J, for agitating the fiber, and with wire netting P, covering one or more of the door-openings, substantially as set forth.

2. The close tank A, of rectangular form, mounted on hollow axes or journals, and provided with a door, N, in each of its four sides, the door-opening equaling in area about one-half the area of the side, with four rows of inwardly-projecting prongs, J, arranged about midway of the sides, respectively, and with nettings P, covering one or more of said door-openings, whereby the fiber may be examined from time to time without danger of its falling out.

In witness whereof we have hereunto signed our names in the presence of two subscribing witnesses.

GEORGE TOLSON.
JOHN EDWIN TOLSON.

Witnesses:
C. W. WHITMAN,
   *U. S. Consular Agent.*
A. B. CROSSLEY,
   *Patent Agent.*